United States Patent [19]

Steele

[11] 4,148,527
[45] Apr. 10, 1979

[54] DUMPING TRANSPORT VEHICLE PARTICULARLY FOR COTTON BOLLS

[75] Inventor: Billy S. Steele, Corpus Christi, Tex.

[73] Assignee: E. L. Caldwell & Sons, Inc., Corpus Christi, Tex.

[21] Appl. No.: 828,246

[22] Filed: Aug. 26, 1977

[51] Int. Cl.² .............................................. B60P 1/16
[52] U.S. Cl. ...................................... 298/10; 298/18; 298/22 P
[58] Field of Search ................... 214/314, 318, 701 Q, 214/501; 280/677, 626; 105/263, 271, 274, 275; 298/10, 11, 17 R, 17.7, 18, 19 R, 22 R, 22 P; 296/28 D

[56] References Cited

U.S. PATENT DOCUMENTS

| | | | |
|---|---|---|---|
| 2,947,571 | 8/1960 | Hagen | 298/10 |
| 3,205,011 | 9/1965 | Diem | 298/10 |
| 3,409,328 | 11/1968 | Hamby et al. | 298/10 X |
| 3,712,675 | 1/1973 | Schoenwald | 298/10 |
| 3,830,543 | 8/1974 | Kostman | 298/10 |
| 3,995,894 | 12/1976 | Bishop | 298/10 |
| 4,059,942 | 11/1977 | Trimble et al. | 298/18 X |

FOREIGN PATENT DOCUMENTS

| | | | |
|---|---|---|---|
| 628371 | 10/1961 | Canada | 298/17 R |
| 1401949 | 8/1975 | United Kingdom | 298/11 |
| 372095 | 4/1973 | U.S.S.R. | 298/10 |

Primary Examiner—Frank E. Werner
Attorney, Agent, or Firm—B. P. Fishburne, Jr.

[57] ABSTRACT

A dumping transport vehicle is provided for transporting picked or stripped cotton from a harvester back to the module. A large capacity dump box or basket features strategically located wire mesh panels to allow air to escape when the cotton is delivered into the dump basket so that the cotton will not boil out over the top of the dump basket and will properly settle therein. Additionally, the vehicle features improved geometry for the basket dumping cylinders in relation to the dumping pivot for the basket and the supporting wheeled frame so that the loaded device will be stable and will remain adequately stable when the cotton is dumped into the top of the module.

1 Claim, 5 Drawing Figures

U.S. Patent Apr. 10, 1979 Sheet 1 of 3 4,148,527
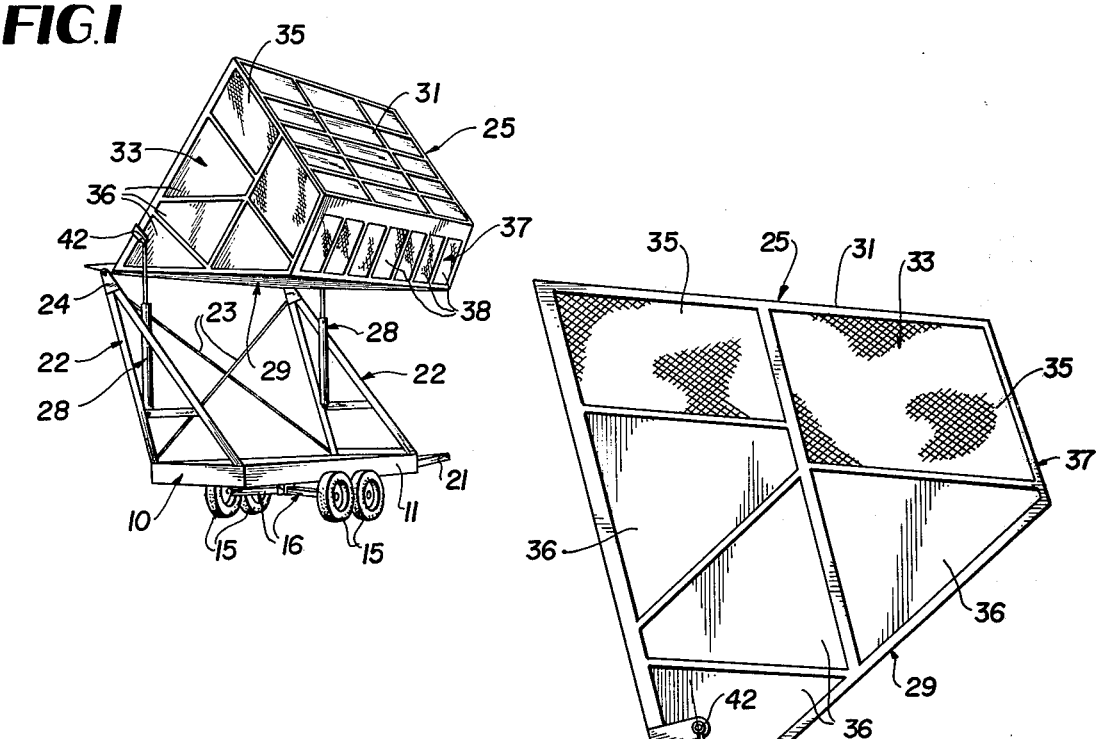
FIG.1
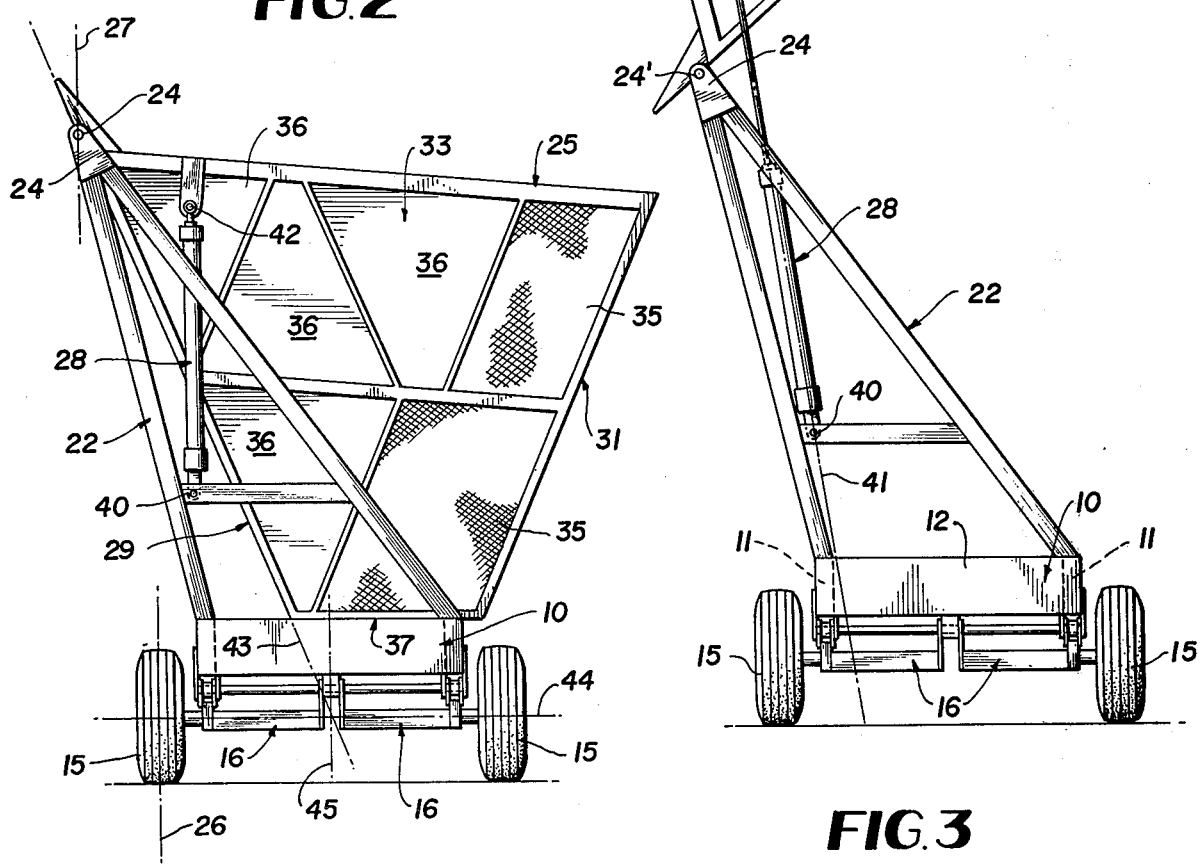
FIG.2
FIG.3

DUMPING TRANSPORT VEHICLE PARTICULARLY FOR COTTON BOLLS

BACKGROUND OF THE INVENTION

Side dumping vehicles for a variety of materials are known in the prior art and some examples of the patented prior art are contained in the following U.S. Pat. Nos. 3,083,058, 3,712,675, 3,205,011, 3,844,617, 3,937,502.

The present invention is concerned with a broadly similar class of towed side dumping vehicle which is particularly constructed for transporting picked or stripped cotton from a harvester to a module. The objective behind providing the particular specialized cotton transporting and dumping vehicle is to enable the cotton farmer to keep the harvester working in the field and avoid the high cost and wasted time of using the harvester to deliver picked cotton to the module and then deadheading back to the end of a row. By means of the invention, the expensive harvester can be kept working more hours per day anc can take advantage of good harvesting weather, thus reducing the risk of crop deterioration in bad weather.

With the above in mind, the invention has been tailored to meet the problems which are peculiar to handling, transporting and dumping the fluffy lightweight cotton bolls, as distinguished from other materials having vastly different physical properties. The dump body or basket of the vehicle is constructed with wire mesh panels strategically located in its bottom and opposite end walls to permit the escape of air when the picked cotton is delivered into the dumping basket from the harvester. Without these air escape panels in proper locations, the loose cotton would simply boil and float over the open top of the basket on the cushion of air built up therein under the cotton. No known prior art vehicle is suitable in this respect for handling picked or stripped cotton.

A further feature of the invention adapting it to its very specialized mission resides in the provision of a dump body or basket having a capacity to hold two to three bales of picked cotton or two and one-half bales of stripped cotton. To achieve this, the basket must have a load holding volume of about 850 cubic feet.

Under such capacity or loading, the stability of the transport and dumping vehicle becomes of prime importance, and herein lies a further important aspect of the invention distinguishing it from the generally similar devices in the prior art. The geometric arrangement of the elevated dump basket pivot relative to the main frame wheels and the location of the dump basket hydraulic cylinders in relation to the main horizontal wheeled frame are quite critical to achieving stability particularly during dumping and retaining within reasonable limits the force required to raise and dump the loaded basket. A unique geometric arrangement of critical pivots and planes have been created in the invention to render the invention safe and very efficient as well as simplified and economical to manufacture.

Other features and advantages of the invention will become apparent during the course of the following description.

BRIEF DESCRIPTION OF THE DRAWINGS

FIG. 1 is a perspective view of the invention showing the dump basket in an intermediate elevated position.

FIG. 2 is an end elevation on an enlarged scale showing the dump basket fully lowered.

FIG. 3 is a further end elevation showing the dump basket in its full elevated dumping position.

DETAILED DESCRIPTION

Figure 4:
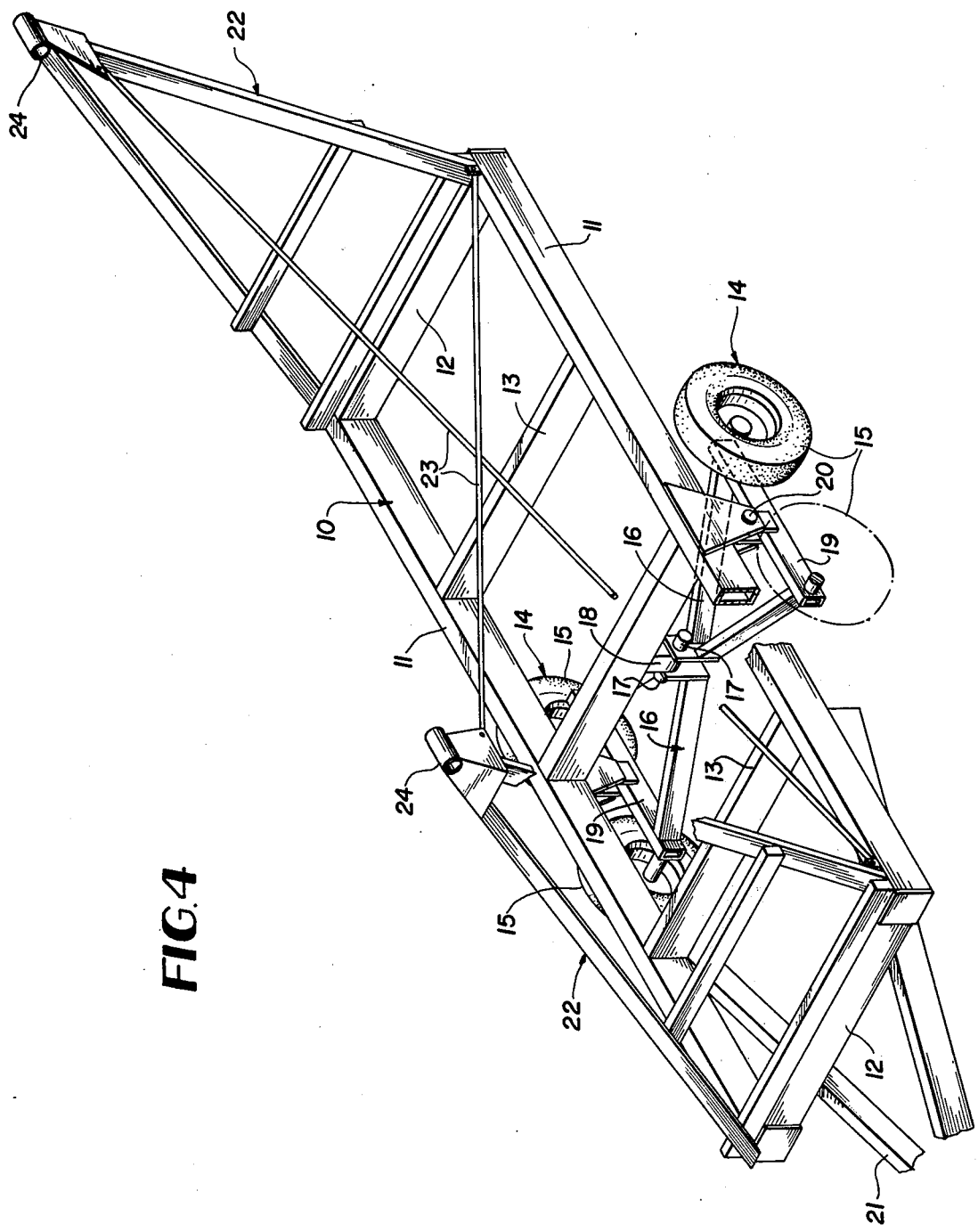
FIG. 4 is a fragmentary perspective view of the wheeled frame and walking beam axle structure employed in the invention.

Referring to the drawings in detail wherein like numerals designate like parts, FIG. 4 depicts the frame of the cotton transporting and dumping vehicle which includes a main horizontal bed frame 10 of rectangular form having sturdy parallel box beam longitudinal sides 11, transverse ends 12, and suitable cross braces 13. The bed frame 10 is supported at a comparatively low elevation on dual tandem wheel units 14 whose tandem wheels 15 are carried by axles on triangular walking beam wheel frames 16 whose inner ends are pivotally secured at 17 to a heavy depending lug 18 disposed centrally on the bed frame 10. The outer longitudinal bars 19 of walking beam frames 16 are pivoted as at 20 to the longitudinal frame sides 11 coaxially with the pivots 17. With the described arrangement, the vehicle is able to transport heavy loads over rough ground without great stress and the tandem wheels 15 on their walking beam frames are preferably equipped with high flotation tires.

The forward end of the base frame 10 carries a suitable draft tongue 21, whereby the device may be drawn behind a tractor during its travels between the cotton harvester and module.

Upstanding parallel triangular end frames 22 rise from the opposite ends of the bed frame 10 and are rather abruptly inclined and offset toward one side of the vehicle, FIG. 3. As to the heights of the end frames 22, it must be kept in mind that the invention must be capable of dumping up to three bales of cotton cleanly into the top of an eleven foot high module. Therefore, the tops of the frames 22 are well above this height and are approximately fourteen feet above ground level. The end frames 22 are rendered rigid with the horizontal bed frame 10 by suitable tie bars 23, or equivalent means.

As shown in FIGS. 2 and 3, the tops of the triangular end frames 22 which define the horizontal longitudinal axis pivots 24 for the opposite ends of cotton transport and dump basket 25 are laterally extended to lie considerably outwardly of a center vertical plane 26, FIG. 2, through the adjacent side wheels 15. This lateral offset distance for the basket pivots 24 is the distance between the vertical plane 26 and another vertical plane 27 through the basket pivot axis.

Thus, the swing or pivot axis of the basket 25 lies laterally well outside of the adjacent wheels 15. This particular geometry naturally tends to render the vehicle unstable laterally when the basket 25 is raised fully to the dumping position, and as previously noted, a main feature of the invention is the provision of offsetting geometric arrangements particularly in connection with the basket hydraulic lift cylinders 28 to counteract the instability inherently present due to the height and lateral location of the basket pivot axis relative to the wheeled bed frame 10.

Figure 5:
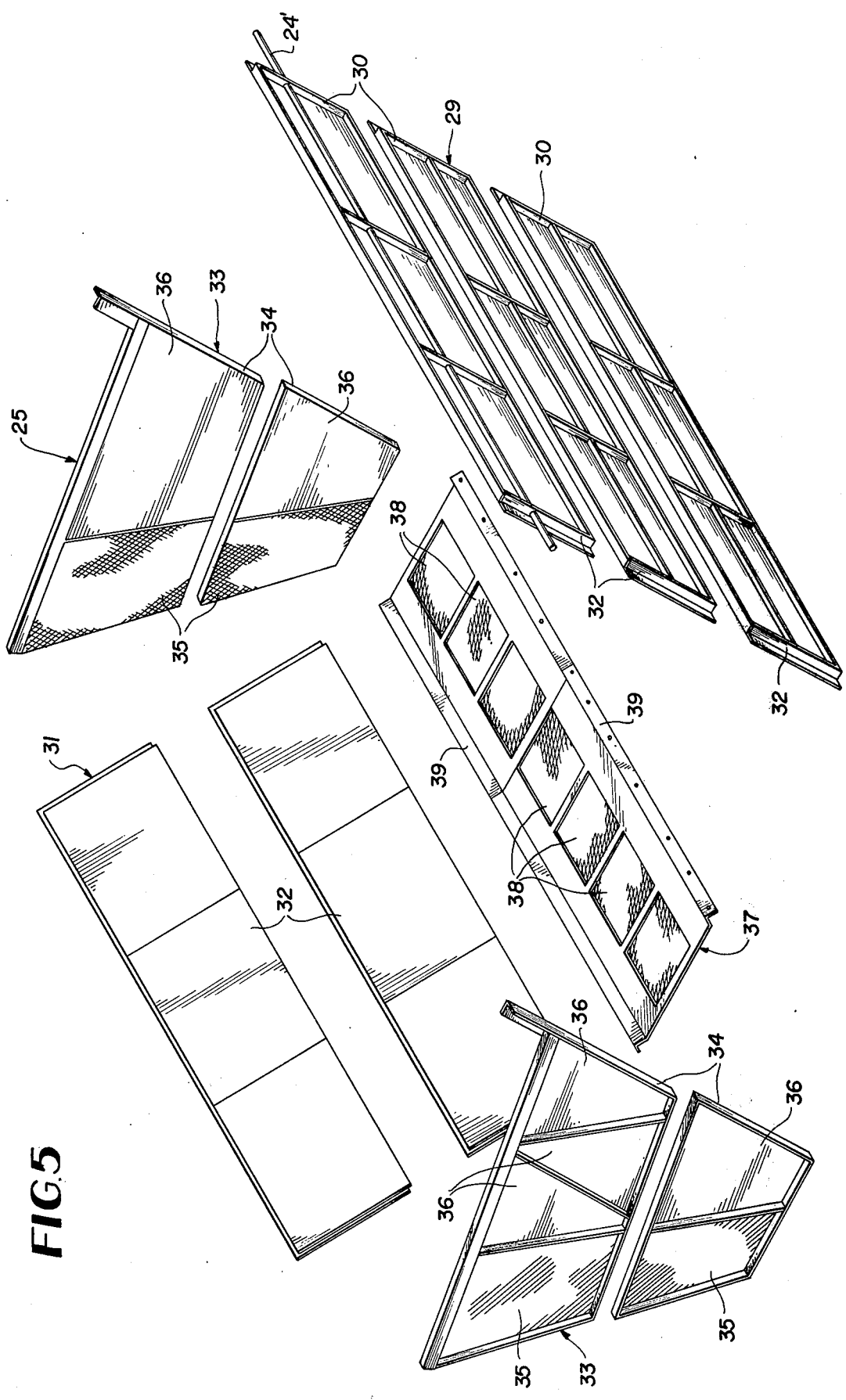
FIG. 5 is an exploded perspective view of dump basket components prior to assembly.

The basket 25 in its construction also forms a major feature of the invention. As shown, the basket 25 is downwardly tapering at its opposite longitudinal side walls with a comparatively narrow flat truncated bottom wall and vertical end walls, the broad top of the dump basket being open. Because of its large capacity, the basket 25 is preferably but not necessarily sectional to facilitate manufacturing and assembling, FIG. 5. Its sloping side wall 29 nearest the pivot axis 24' is formed in three sections 30 which can be bolted or otherwise rigidly connected. The sections 30 are constructed of smooth solid sheet metal to promote the sliding of cotton on the side wall 29 when the cotton is dumped, FIG. 3.

The opposite inclined side wall 31 of somewhat lesser height than the side wall 29, FIG. 2, is similarly formed from connectable sections 32 whose inner faces consist of solid smooth sheet metal.

The two vertical truncated wedge-like end walls 33 of the dump basket are also formed in two connectable sections 34 and the walls 33 have open mesh or wire screen panels 35 provided therein over relatively large areas adjacent to the side wall 31 and remote from the pivot axis 24 of the basket. The remaining areas of the end walls 31 are formed of smooth solid or unperforated sheet metal 36.

The relatively narrow bottom wall 37 of basket 25 is composed over the major portion of its entire area with wire mesh panels 38 which are framed for rigidity, as shown. The bottom wall is flanged at 39 for rigid attachment to the walls 29 and 31.

The several wire mesh panels 35 and 38 thus form a substantially continuous free air passage or breathing means around the basket end and bottom walls near the side wall 31 away from the pivot axis of the basket. The arrangement prevents air from being trapped in the basket when the picked or stripped cotton is introduced. Were this allowed to happen, the fluffy lightweight cotton would bounce and boil on the trapped cushion of air and spill over the top of the basket 25 instead of settling properly therein. The described locations of the mesh panels 35 and 38 are quite essential to the most efficient operation of the invention.

Near its top edge, the basket wall 29 carries a pivot bar 24' which is received by the pivots 24 of end frames 22.

The dump basket 25 is swung to and from its cotton dumping position by the previously-noted hydraulic cylinders 28 whose strokes are equalized by conventional flow divider means, whereby the two cylinders have equal extension regardless of variations in the basket load. The location of the cylinders 28 and their connections with the basket 25 and end frames 22 are quite critical in their relationship to the basket pivot 24' and the bed frame 10. In this respect, the lower cylinder connections 40 with the end frames 22 are located so that when the basket 25 is raised to its fullest extent, FIG. 3, an inclined plane 41 through the axes of the cylinders 28 intersects the bed frame 10 just inside of the near longitudinal frame side 11. This utilizes to the maximum possible extent the weight of the bed frame 10 to prevent tipping of the vehicle laterally when the cylinders 28 are fully extended. The weight of the frame 10 will counteract the momentum of the swinging basket 25. The rod connections 42 of the cylinders 28 with the basket 25 are quite close to the pivot axis 24' and near the open top of the basket to achieve the described geometry and stabilizing of the vehicle laterally.

One further important geometric feature of the invention is the following. The basket 25 is shaped so that the slope of its dumping side wall 29 is such, when the basket is fully lowered onto the base frame 10, FIG. 2, that a plane 43 along the dumping side wall 29 and through the basket pivot 24' will intersect a horizontal plane 44 through the center of the wheels 15 at a transverse center line 45 of the main or bed frame 10. This arrangement, when the basket 25 is raised for dumping, causes the center of gravity of the basket to move closer to the basket pivot 24' and in effect reduces the force required to raise the basket to its dump cycle.

In summation, an efficient and economical device is provided by the invention for transporting heavy loads of cotton from the harvester to the module so that the continued use of the harvester will not be interrupted. The vehicle is geometrically constructed to be stable when loaded and during dumping while at the same time providing ample wheel clearance to allow the dumping vehicle to pull up close to the side of the module. The elevated and laterally offset basket pivot 24' allows clear dumping without spillage of cotton into the top of the eleven foot module.

The advantages of the invention for its specialized purpose over the prior art will be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A transport and side dumping vehicle for picked or stripped cotton comprising a wheeled horizontal low elevation comparatively massive bed frame, spaced upstanding end frames fixed on the bed frame adjacent to its ends and comprised of upwardly converging members which are inclined toward one side of the bed frame and extend considerably laterally outwardly of one side of the bed frame at the tops of said end frames, the tops of said end frames defining dump basket pivots which are positioned a substantial lateral distance outside of the adjacent wheels of the bed frame, an open top transport and dump basket for cotton bolls having downwardly converging sloping side walls longitudinally of the vehicle, end walls near and inwardly of the end frames and a comparatively narrow flat bottom wall which is offset laterally toward the side of the bed frame away from said basket pivots when the bottom wall of said basket is substantially resting on the horizontal bed frame, the arrangement being such that the sloping side wall of said basket nearest to said basket pivots is disposed in an inclined plane intersecting the common axis of said pivots and also intersecting a center vertical plane through the horizontal bed frame at the point where such vertical plane intersects a horizontal plane through the wheel axes of the vehicle, the bottom wall of said basket and the two end walls thereof including foraminous air breathing panels, and the air breathing panels of said end walls being located adjacent the sloping basket side wall remote from said basket pivots, the remaining areas of said end walls being solid, a horizontal longitudinal pivot shaft carried by one basket side wall and being rotationally engaged with said basket pivots of the end frames, and a pair of simultaneously acting basket raising and lowering cylinders immediately inwardly of the end frames and between the end frames and the basket end walls, the lower ends of said cylinders being pivotally connected to said end frames substantially below the tops of the end frames defining said pivots and comparatively nearer but above the elevation of the bed frame, said last-named pivotal connections of said cylinders with the end frames being nearly vertically aligned with the adjacent longitudinal side of the bed frame, the upper rod ends of the cylinders being pivotally connected with the basket close to the top of the basket and near but somewhat laterally inwardly of and somewhat below said basket pivots, the locations of said cylinder axes being such that when the basket is elevated by the clyinders to a full dumping position a plane defining the open top of the basket is substantially parallel to the inclined side members of the end frames nearest the basket pivots and another plane through the axes of the cylinders and through their upper and lower connections with the basket and end frames intersects a horizontal plane at the top of the bed frame immediately inwardly of the longitudinal side member of the bed frame nearest to the basket pivots.

* * * * *